Figure 4:
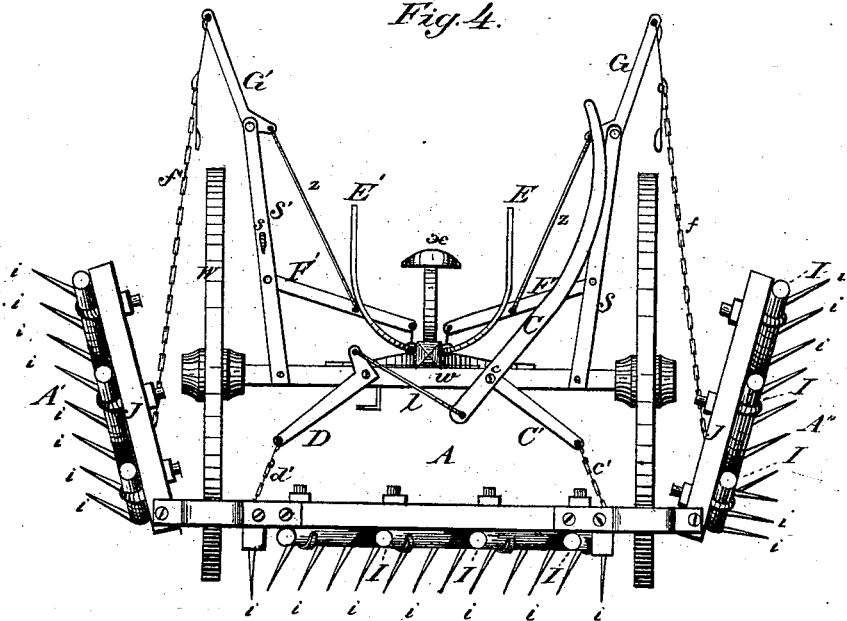

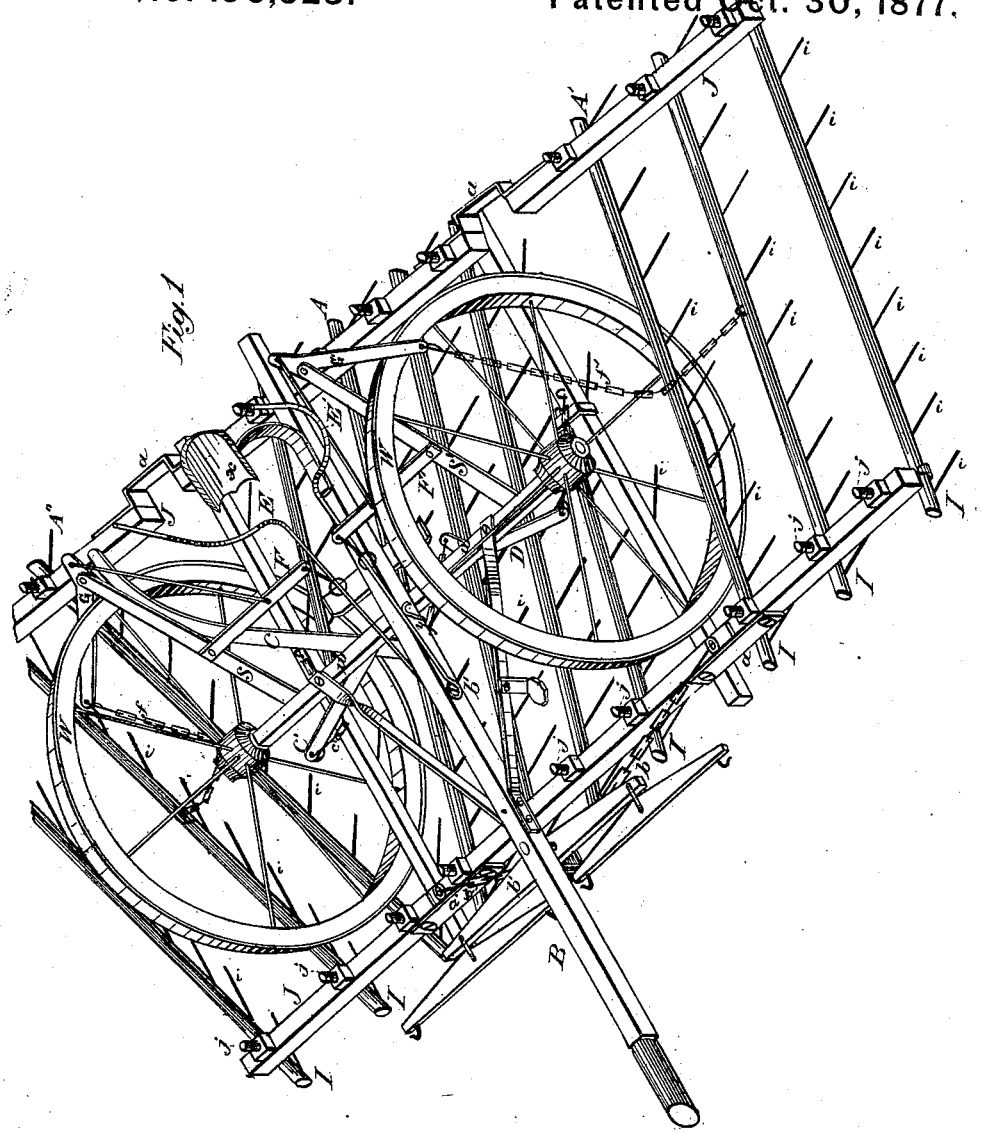

P. F. FLEMING.
Combined Sulky-Harrow and Cultivator.
No. 196,523. Patented Oct. 30, 1877.
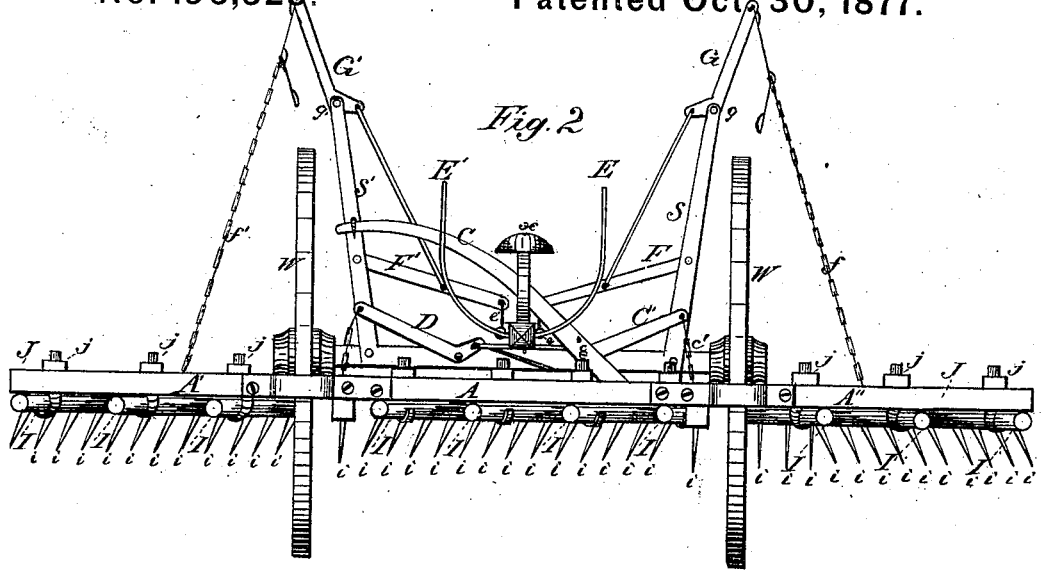
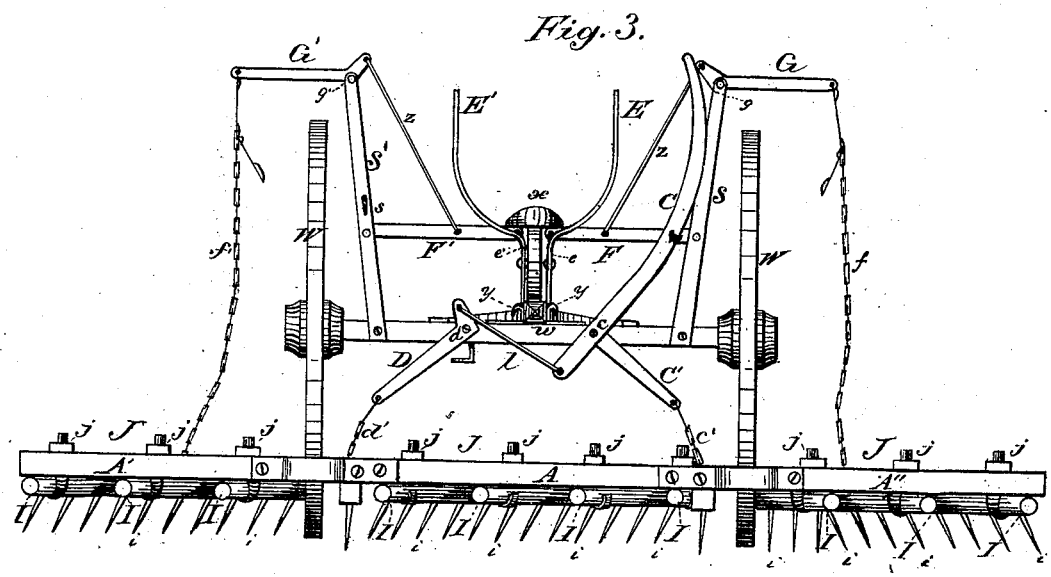

P. F. FLEMING.
Combined Sulky-Harrow and Cultivator.
No. 196,523. Patented Oct. 30, 1877.

UNITED STATES PATENT OFFICE.

PETER F. FLEMING, OF SALISBURY, MISSOURI.

IMPROVEMENT IN COMBINED SULKY HARROW AND CULTIVATOR.

Specification forming part of Letters Patent No. 196,523, dated October 30, 1877; application filed September 2, 1876.

*To all whom it may concern:*

Be it known that I, PETER F. FLEMING, of Salisbury, in the county of Chariton and State of Missouri, have invented certain new and useful Improvements in Combined Sulky Harrows and Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a perspective view of my invention. Fig. 2 is a rear view, showing the harrow and cultivator raised. Fig. 3 is a rear view, showing the harrow and cultivator lowered. Fig. 4 is a rear view, showing the central section of the harrow and cultivator lowered, and the side sections raised.

My invention consists in an improved arrangement of devices for raising and lowering the toothed sections of a sectional sulky harrow and cultivator, whereby the entire strain is exerted upon the axle, and immediately over the center of the wheels, at the most firmly-supported part of the implement.

W W are the wheels, and $w$ the axle, of the sulky. A is the central, and A' A'' are the side, sections of a toothed frame of a sectional harrow and cultivator. The central and side sections are hinged together at $a\ a\ a\ a$, and the central section A is hitched to the center beam B of the sulky by chains $b\ b$. C is a curved lever, pivoted to the axle $w$ at $c$. An arm, C', is rigidly attached to this lever, and its outer end is connected with one of the side beams of the central section A by a chain, $c'$. D is a bent lever, pivoted to axle $w$ at $d$. The short arm of this lever is connected with the lower end of short arm of lever C by a link, $l$.

The long arm of lever D is connected with one of the side timbers of central section A by a chain, $d'$. When the central section A is raised, the lever C occupies the position shown in Fig. 2, and is retained in this position by a catch, $s$, on the standard S', which rises from the axle $w$. When the central section is lowered, the lever C occupies the position shown in Figs. 3 and 4.

E E' are bent levers. Lever E' is pivoted to center beam B at $b'$, and lever E is pivoted to said beam at a corresponding point on the opposite side. The other or free ends of levers E and E' are bent upward, terminating on each side of the driver's seat X. F F' are arms, the outer ends of which are pivoted to the standards S S', and the inner ends reach to near the center beam B, and are connected with levers E E' by links $e\ e'$. G G' are bent levers, pivoted at the elbows $g\ g'$ to the standards S S'.

The inner or short arms of these levers G G' are connected to arms F F' by rods $z\ z$, and the outer or long arms of said levers are connected with the center-beams of sections A' A'' by chains $f f'$.

When the three sections of the toothed frame are raised, the levers E E' G G' and arms F F' occupy the positions shown in Fig. 2, the levers E E' being retained in this position by catches $y\ y$.

When the machine is on the road, the sectional toothed frame is raised, as shown in Fig. 2.

On reaching the field where the harrow or cultivator is to be used, the driver leans forward in his seat, and, seizing the curved lever C, releases it from catch $s$, and allows it to rise, thus lowering the central section A of the toothed frame to the ground, the various parts assuming the positions shown in Fig. 4.

The machine may be used thus arranged, if desired, without lowering the side sections; but if it is desired to cover more ground, the driver seizes the upward bent ends of levers E E', and, releasing said levers from the catches $y\ y$, allows them to rise, when the parts assume the positions shown in Fig. 3.

Either of the side sections may be raised separately, in order to avoid a fence, stump, or other obstruction. In fact, the manner of using the machine, as so far described, is too obvious to require explanation.

I designates the toothed beams of the sections of the harrow and cultivator frame, and $i$ the teeth, which are sharp-pointed, rigidly attached to the beams I, and inclined slightly rearward. The beams I are adjustable, and are secured to the cross-beams J by means of clamp-bolts $j\ j\ j\ j$, which pass through beams J, and have their lower ends formed into hooks, which embrace the toothed beams I, the upper ends being screw-threaded and provided with nuts.

When the machine is to be used simply as a harrow, the beams I should be adjusted so that the teeth $i$ will project downward in vertical planes parallel with the course of the sulky, as shown in Fig. 2.

In order to convert the implement from a harrow into a cultivator, I loosen the nuts of the clamp-bolts $j\ j\ j$, thus relaxing the hold of the hooks upon the beams I, and turn said beams so that the teeth are inclined sidewise in either direction, as desired, thus giving said teeth an under cut, which is very effective in destroying weeds and loosening up the ground.

I am aware of the patent of B. W. Taylor, granted January 25, 1876, and numbered 172,796, for a sectional wheel-harrow, and hereby disclaim the arrangements of the sections as shown in said patent.

I also disclaim the raising and lowering devices shown in said patent and in the patents of J. Kimball, granted March 2, 1875, and P. Speelmon, granted November 4, 1873.

Having now described my invention, and explained its operation, I claim—

The combination of levers E E', vertical standards S S', rising from axle $w$, arms F F', elbow-levers G G', working directly over the centers of the wheels, chains $f\ f'$, and connecting-links, with wing-toothed sections A' A'', for raising and lowering the same, substantially as set forth.

In testimony that I claim the foregoing as my own I affix hereto my signature in presence of two witnesses.

PETER F. FLEMING.

Witnesses:
　S. B. GILLILAND,
　I. I. COMMINGS.